March 4, 1941.  V. G. NEBUDA  2,234,081
STRAW BUNCHER AND DISCHARGE MEANS FOR COMBINES
Filed June 25, 1940  2 Sheets-Sheet 1
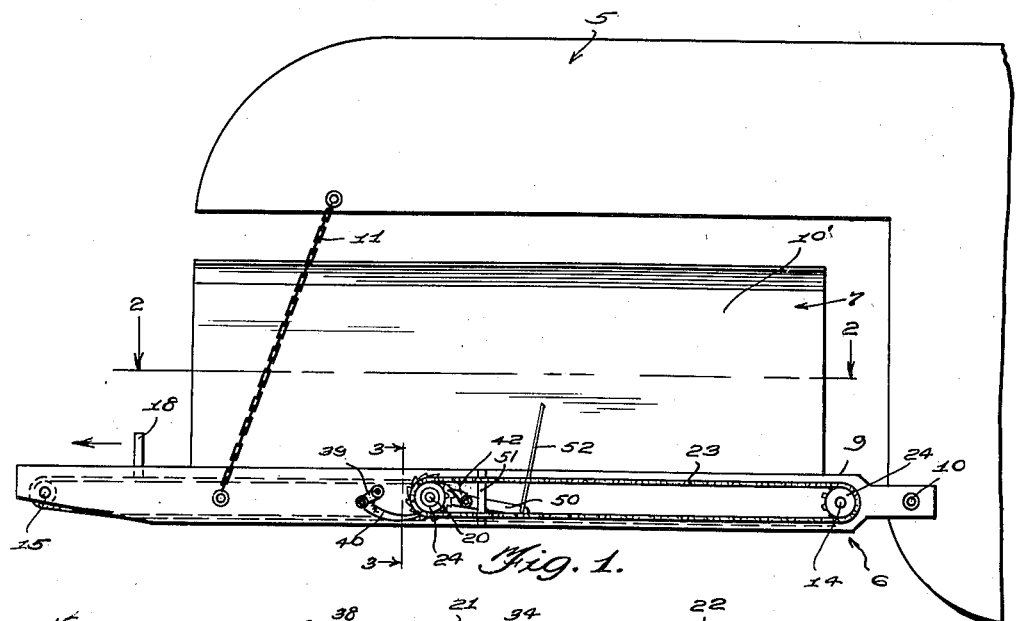
Inventor
VLADIMIR G. NEBUDA,
By Clarence A. O'Brien
Attorney March 4, 1941. V. G. NEBUDA 2,234,081
STRAW BUNCHER AND DISCHARGE MEANS FOR COMBINES
Filed June 25, 1940 2 Sheets-Sheet 2
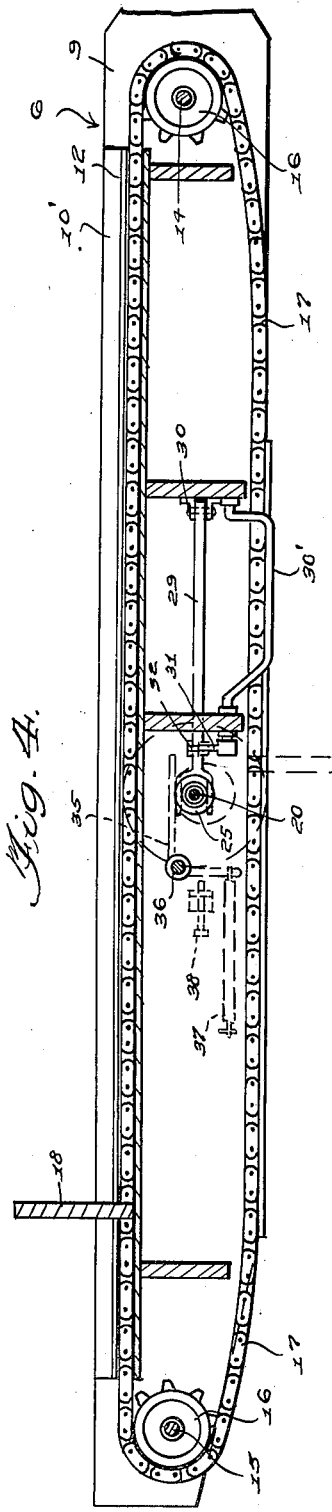
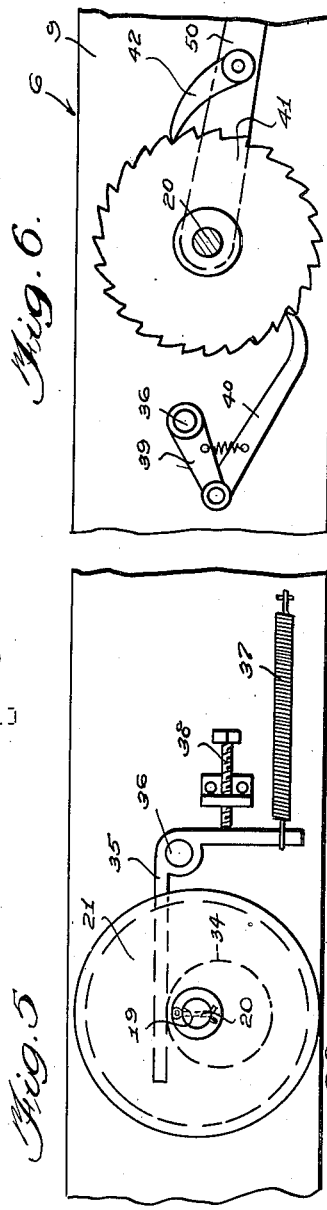
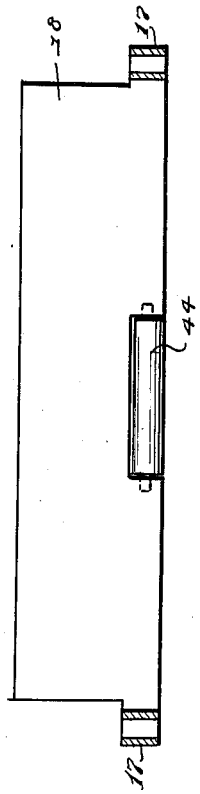
Inventor
VLADIMIR G. NEBUDA,
By Clarence A. O'Brien
Attorney

UNITED STATES PATENT OFFICE 2,234,081

STRAW BUNCHER AND DISCHARGE MEANS FOR COMBINES

Vladimir G. Nebuda, West Point, Nebr.

Application June 25, 1940, Serial No. 342,377

4 Claims. (Cl. 56—122)

This invention relates to a straw buncher and discharge means for combines and similar machines, and has for the primary object, the provision of a device of this character which may be easily installed on a machine of the character specified to receive therefrom the straw as thrashed of grain and which will collect said straw until a desired amount has been accumulated and then automatically deliver said accumulated straw in a pile on the ground.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a buncher and discharge means applied to a fragmentary portion of a combine and constructed in accordance with my invention.

Figure 2 is a sectional view taken on the line 2—2 of Figure 1.

Figure 3 is a sectional view taken on the line 3—3 of Figure 1.

Figure 4 is a longitudinal sectional view illustrating the conveyor mechanism of the buncher and delivery means and a portion of the operating means therefor and taken on line 4—4 of Figure 2.

Figure 5 is a fragmentary side elevation illustrating a part of the drive mechanism.

Figure 6 is a fragmentary side elevation, partly in section, illustrating a ratchet mechanism employed in the drive mechanism.

Figure 7 is a fragmentary top plan view illustrating a clutch forming a part of the drive mechanism.

Figure 8 is a side elevation, partly in section, of a follower or pusher forming a part of the delivery means with links (shown in section) of the conveyor formed on the follower or picker.

Referring in detail to the drawings, the numeral 5 indicates the straw discharge chute of a combine or similar machine and which has associated therewith to receive the straw as discharged by said machine, the present invention indicated generally by the character 6 and which includes a hopper 7 and a supporting frame 9. The supporting frame 9 is arranged horizontally with one end fastened to the combine, as shown at 10, and the opposite end supported by flexible elements 11 attached thereto and to the discharge chute 5 of the combine or similar machine positioning the hopper 7 to receive the straw as discharged. The hopper includes vertical side walls 10' and has the ends thereof open. The vertical walls of the hopper are mounted on parallel members constituting a part of the frame 9, as clearly shown in Figure 3, and the vertical side walls have horizontally disposed flanges 12 acting as guards for a conveyor mechanism which forms a part of the present invention. A bottom wall 13 is supported by the parallel side members of the frame 9 directly under the hopper 7 and over which the upper run of the conveyor mechanism extends. The bottom wall 13 extends to a point adjacent the rear or discharge end of the frame 9. The side members of the frame rotatably support conveyor shafts 14 and 15 and have secured thereon sprocket gears 16 over which are trained sprocket chains 17 forming a part of the conveyor mechanism and the upper runs of said chains pass under the guard flanges 12 of the hopper 7 to be protected from the straw. The shafts 15 are of the stub type and have the gears 16 at one end of the conveyor secured thereon. A pusher or flight 18 is secured to the conveyor chains and extends at right angles thereto. The pusher or flight travels in the direction indicated by the arrow in Figure 1 so that it will remove from the hopper the straw that accumulates therein and discharge the same at the end of the frame in a pile on the ground.

Drive and driven shafts 19 and 20 are journaled on the frame 9 substantially intermediate its ends and have telescopic fit with each other, as clearly shown in Figure 3. A drive belt pulley 21 is secured to the drive shaft 19 to receive a drive belt 22. The drive belt 22 is suitably connected to a power takeoff on the combine. The driven shaft 20 is connected to the conveyor shaft 14 by a sprocket chain 23 and sprocket gears 24.

A clutch 25 is employed for connecting and disconnecting the drive and driven shafts 19 and 20 and consists of a clutch element 26 secured to the drive shaft 19 and a coacting clutch element 27 splined on the driven shaft 20 and spring influenced into engagement with the clutch element 26 by a spring 28. A forked lever 29 is engaged with the clutch element 27 and is pivotally mounted on the frame, as shown at 30. The clutch is normally engaged by the spring 28 to establish driving connection between the drive shaft 19 and the driven shaft 20.

A trip member 30' is journaled on the frame and includes an arm 31 connected to the lever 29 by a link 32. The spring 28 of the clutch also acts to position the trip member 30' in the path of movement of the pusher or flight 18 during the latter's travel underneath of the frame for return to the hopper 7. The trip member 30' is of sufficient length to permit the flight or pusher 18 to remain in engagement therewith for a predetermined length of time. When the trip member 30' is in engagement with the flight or pusher it automatically operates the clutch to declutch the shafts 19 and 20.

Whenever the clutch 25 is engaged a continuous drive will be had to the conveyor mechanism.

A cam 34 is secured to the drive shaft 19 and is adapted to move into and out of engagement with an operating arm 35 in the shape of a bell crank lever and which is secured to an operating shaft 36 journaled on the frame. It will be seen that one arm portion is positioned to be engaged by the cam 34 while the other arm portion has connected thereto a spring 37 acting to position the arm 35 for engagement with the cam. A set screw 38 is adjustably mounted on the frame to engage with the operating arm for limiting the movement of one of its arm portions under the influence of the spring 37 towards the cam and by adjusting the set screw the arm 35 may be kept from engaging the cam during certain positions of the latter. The operating arm 35 actuated by the cam 34 is adapted to impart rotation to the shaft 36 in opposite directions. An arm 39 is secured to the shaft 36 and has pivotally connected thereto a spring influenced dog 40 operating in conjunction with a ratchet gear 41 secured on the driven shaft 20. A dog 42 engages with the ratchet gear 41 to prevent reverse rotation of the latter. During the rotation of the shaft 36 in opposite directions by the cam 34, the dog 40 imparts to the driven shaft 20 through the ratchet gear 41 a step by step rotation. Consequently, it will be seen when the clutch 25 is disengaged by the flight 18 engaging the trip 30', the conveyor mechanism of the device will receive a step by step movement and with intervals of idleness when the cam 34 is disengaged from the operating arm 35. The purpose of this action is to delay the flight or pusher 18 reaching the hopper, permitting sufficient straw to accumulate therein to form a pile when discharged therefrom. As soon as the flight or pusher disengages from the trip member 30', the clutch automatically engages and restores the drive between the drive and driven shafts in bringing about a continuous movement of the conveyor mechanism so that the pusher or flight will travel through the hopper and remove therefrom the straw and deliver the same onto the ground in a pile.

It is preferable that the pusher or flight be equipped with a roller 44 to contact the trip member 30'.

From the foregoing description, when taken in connection with the drawings, it will be seen that a very simple, durable and compact device has been provided which can be easily installed upon a combine to receive therefrom the straw as thrashed and which will accumulate the straw until a sufficient amount has been received to form a comparatively large pile and then will automatically discharge the accumulated straw onto the ground.

The dog 42 is pivoted on a lever 50 and the latter is journaled on the shaft 20 and has a limited movement in a bracket 51 secured on the frame 6. An operating cable 52 is secured to the free end of the lever 50 whereby the operator may impart movement to the gear 41 and shaft 20 whenever it is desired to advance the pusher 18 when the latter is in engagement with the trip 30'. This is sometimes desirable when the timing of the dumping operation must be varied in order to have the stacks of straw in alignment on the field.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a device of the character described, a frame, a hopper carried by said frame to receive straw from a harvesting machine, an endless conveyor carried by said frame and having one run thereof extending through the hopper and including a flight for the discharge of accumulation of straw in said hopper onto the ground in a pile, drive and driven shafts journaled on the frame, means for connecting the drive shaft to a power source, a clutch for clutching and declutching said shafts, means for connecting the driven shaft to the conveyor, a trip mechanism located in the path of movement of the flight for clutching and declutching the clutch and actuated by the flight engaging and disengaging therewith, and an intermittent drive means driven by said drive shaft for driving the conveyor in a step by step movement when the clutch is declutched by the flight engaging said trip mechanism.

2. In a device of the class described, a frame, means for mounting said frame on a harvesting machine, a hopper supported by said frame to receive materials from the harvester, an endless conveyor supported by the frame and having one run thereof passing through the hopper, a flight secured to said conveyor, drive and driven shafts journaled in said frame and having telescopic fit with each other, a clutch for connecting and disconnecting the shafts, means for connecting the drive shaft to a power source, a trip mechanism pivotally mounted on the frame and located in the path of movement of the flight to be actuated thereby and connected to the clutch, and an intermittent drive means connecting said shafts for driving the conveyor in a step by step movement at the time of the engagement of the flight with the trip mechanism.

3. In a device of the character described, a frame, a hopper carried by said frame to receive materials, an endless conveyor carried by said frame and having one run thereof extending through the hopper, a flight secured to said conveyor, drive and driven shafts journaled on said frame, means for connecting the drive shaft to a power source, a clutch for connecting and disconnecting said shafts, a trip mechanism carried by said frame and located in the path of movement of the flight and connected to the clutch for declutching the shafts during the time of engagement of the flight with said trip mechanism, a third shaft journaled on said frame, means for connecting the driven shaft to said conveyor, a ratchet mechanism connecting the third shaft to the driven shaft, and a drive means connecting the drive shaft to the third shaft for rotating the latter in opposite directions.

4. In a device of the character described, a frame, a hopper carried by said frame to receive materials, an endless conveyor carried by said frame and having one run thereof extending through the hopper, a flight secured to said conveyor, drive and driven shafts journaled on said frame, means for connecting the drive shaft to a power source, a clutch for connecting and disconnecting said shafts, a trip mechanism carried by said frame and located in the path of movement of the flight and connected to the clutch for declutching the shafts during the time of engagement of the flight with said trip mechanism, a third shaft journaled on said frame, means for connecting the driven shaft to said conveyor, a ratchet mechanism connecting the third shaft to the driven shaft, a cam secured to the drive shaft, a spring influenced arm secured to said third shaft and riding the cam to rotate the third shaft in opposite directions by the drive shaft.

VLADIMIR G. NEBUDA.